I. H. CONGDON.
PISTON-PACKING.

No. 194,583. Patented Aug. 28, 1877.

WITNESSES:
H. Rydquist
J. H. Scarborough

INVENTOR:
I. H. Congdon
BY Munn & Co
ATTORNEYS.

UNITED STATES PATENT OFFICE.

ISAAC H. CONGDON, OF OMAHA, NEBRASKA.

IMPROVEMENT IN PISTON-PACKINGS.

Specification forming part of Letters Patent No. 194,583, dated August 28, 1877; application filed July 13, 1877.

*To all whom it may concern:*

Figure 1:
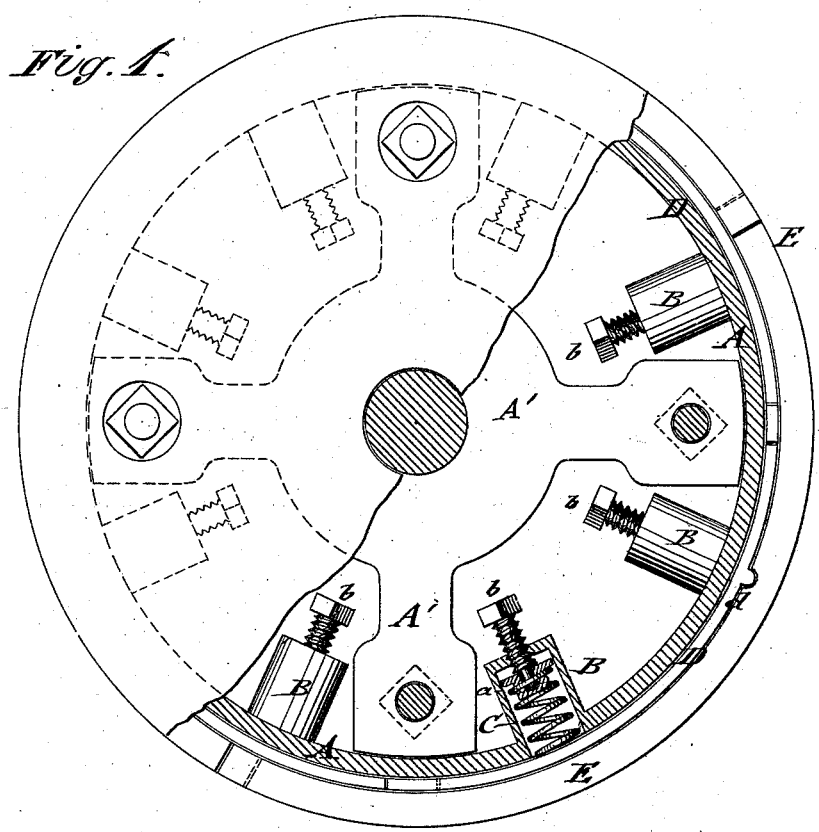
Figure 2:
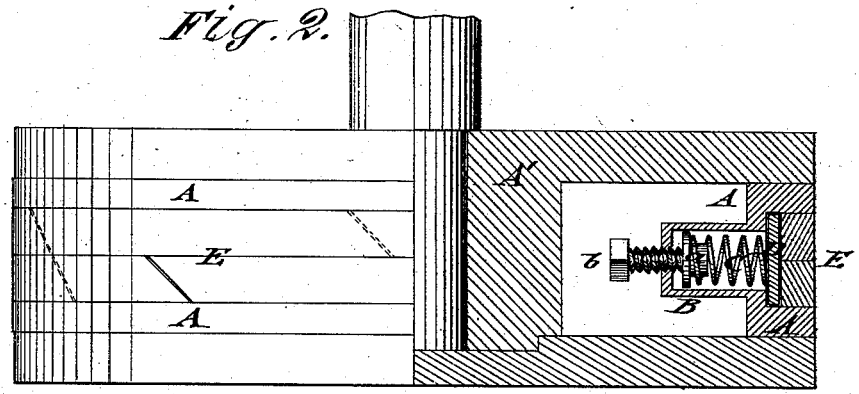

Be it known that I, ISAAC H. CONGDON, of Omaha, county of Douglas, and State of Nebraska, have invented a new and Improved Piston-Packing, of which the following is a specification:

In the accompanying drawings, Figure 1 represents a front view, partly in section, of my improved piston-packing, and Fig. 2 a sectional side elevation of the same.

Similar letters of reference indicate corresponding parts.

The invention relates to an improved piston-packing, by which the packing-rings are evenly pressed against the cylinder, so as to wear in uniform manner; and the invention consists of a solid and annularly grooved ring resting against lugs of the piston-head, and having cylindrical pockets in which adjustable spiral springs are placed that press against an inner sectional ring and outer sectional packing-rings.

In the drawing, A represents a solid ring, with cylindrical pockets B for the spiral springs C. The solid ring A is retained in central position on the radial lugs A' of the piston-head, said lugs being arc-shaped at the outside to form true seats for the ring A. Through the lugs A' are passed the follower-bolts, in the usual manner.

The tension of the spiral springs C is adjusted by means of sliding nuts $a$ and set-bolts $b$, by which the springs are set to give the proper amount of pressure to keep the rings steam-tight.

The pockets B are arranged radially and equidistant, so that the pressure of the springs is divided around the circumference of the packing-rings.

The springs press against an interior packing-ring, D, that is made of several sections, and surrounded by two outer packing-rings, E, both the inner and outer rings being seated in a central annular groove of the solid ring A.

The outside packing-rings E are, preferably, made of three sections each, which break joint with each other, so that steam cannot blow through. To keep the outside packing in this position, a small pin or other stop, $d$, is arranged in connection with the inner packing-ring, and projected into a recess or groove of the outer packing.

The piston-packing can be made of any suitable metal, with the springs of steel, the set-bolts of brass, the pockets, solid ring, and inner packing of cast-iron, and the packing of cast-iron or Babbitt metal.

The packing is specially adapted for locomotive and stationary engines, and is cheaper than the semi-elliptic springs and brass packing in use.

The pressure of the springs adjusts itself as the packing-rings wear off, the springs being readily reset by taking out the follower-bolts and head and turning the set-bolts to the required degree of tension, the follower being readily replaced without interfering with the packing-rings, as they remain in the solid and circumferentially-grooved ring.

Having thus fully described my invention, I claim as new and desire to secure by Letters Patent—

The combination of the lugs or seats of a piston-head and a solid ring, having radial pockets, adjustable springs, and outer circumferential groove, with an inner sectional packing-ring and outer packing-rings, substantially in the manner and for the purpose specified.

ISAAC H. CONGDON.

Witnesses:
ALBERT SWARTZLANDER,
JOHN WILSON,
WILLIAM M. DWYER.